INVENTORS
RICHARD H. HOLLROCK
JUSTIN J. BARZDA

BY
McCormick, Paulding & Huber
ATTORNEYS

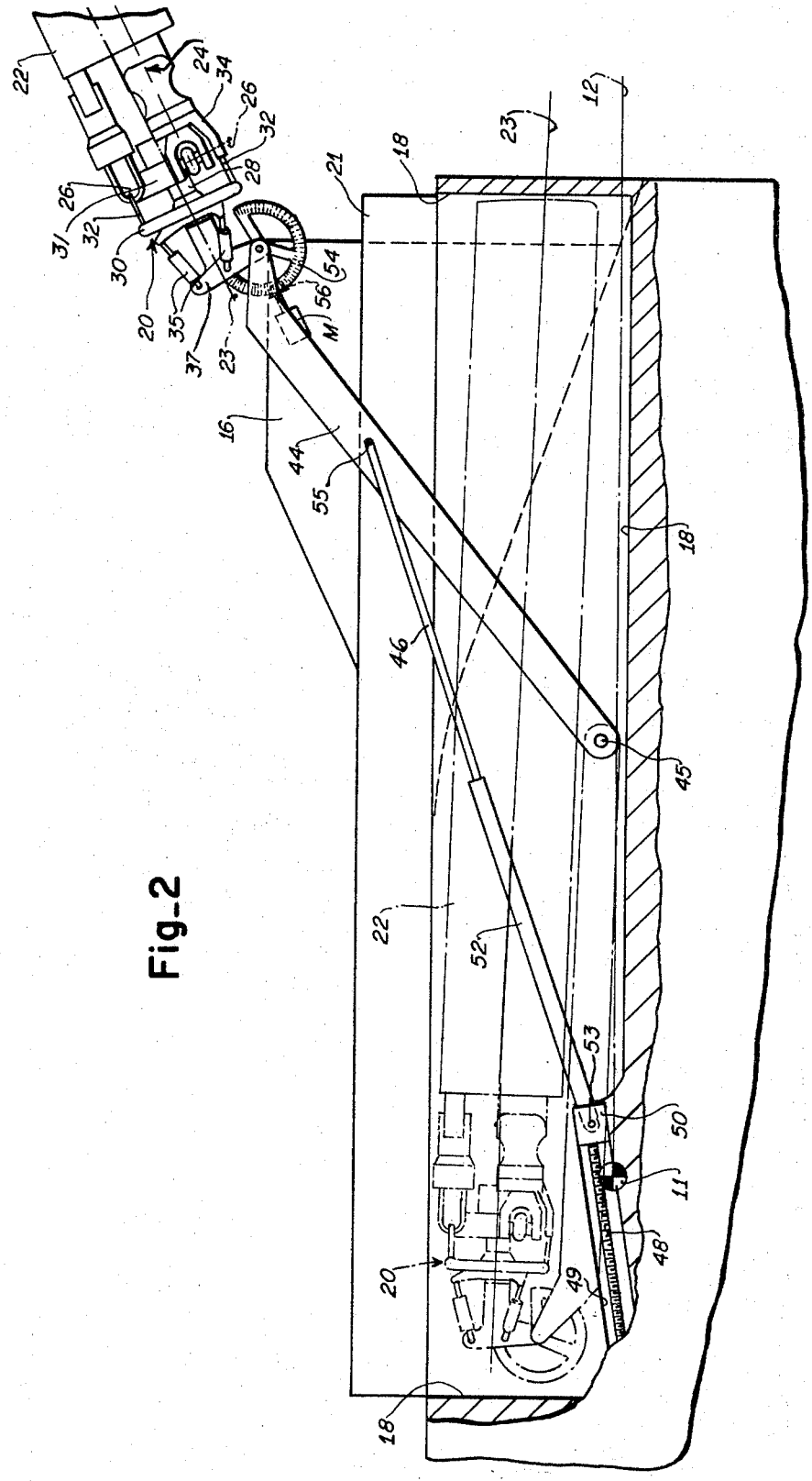

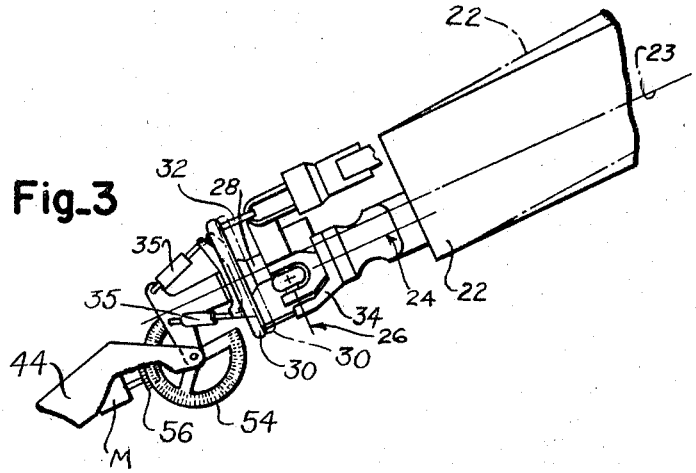
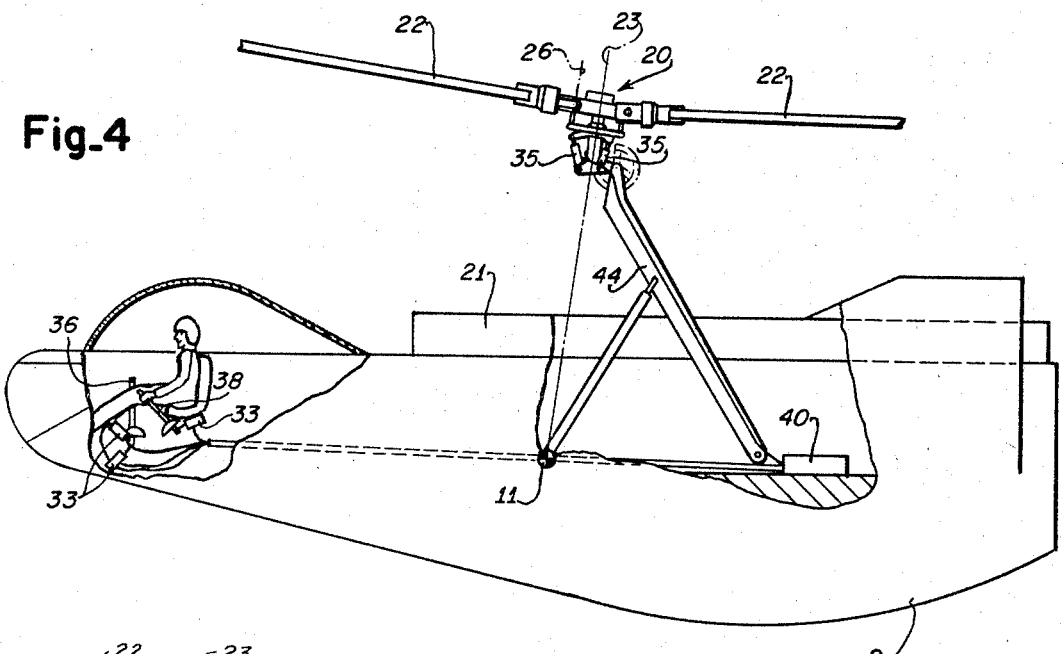
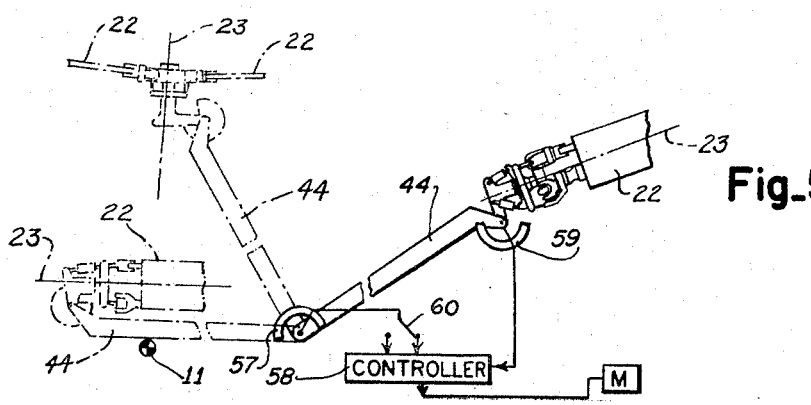

United States Patent Office 3,428,271
Patented Feb. 18, 1969

3,428,271
ATMOSPHERIC ENTRY VEHICLE WITH
STOWED ROTOR
Richard Hollrock, Simsbury, and Justin J. Barzda, Windsor, Conn., assignors to Kaman Corporation, a corporation of Connecticut
Filed June 3, 1966, Ser. No. 555,107
U.S. Cl. 244—17.13                                10 Claims
Int. Cl. B64c 27/50, 27/52; B64d 19/02

ABSTRACT OF THE DISCLOSURE

The entry vehicle has a folded helicopter type rotor stowed therein with the rotor blades telescoped. The rotor hub is pivotally mounted at one end of a mast, which mast is pivotally mounted in the vehicle. An actuator is connected to the mast for rotating it rearwardly while the folded rotor is trailed aft from the free end of the mast. In the trailing position of the rotor, the collective pitch mechanism can be used to skew the folded blades in opposite directions so that the rotor tends to autorotate. Centrifugal force then causes the blades to unfold and to telescope out, after which the mast is moved forwardly to an intermediate position while the rotor hub central axis is kept in line with the vehicle's center of gravity. In the intermediate position collective and cyclic pitch changes achieve conventional control of the rotor blades for low speed approach and landing maneuvers of the vehicle.

---

This invention relates to atmospheric entry vehicles, or lifting bodies as they are sometimes called, and deals more particularly with a lifting body having a rotor which can be deployed during gliding flight of the body.

A general object of the present invention is to provide an atmospheric entry vehicle which has a rotor adapted to be deployed in flight so as to decelerate the vehicle, and which rotor can also be used to improve the gliding characteristics of the basic vehicle especially at low speeds.

Another general object of the present invention is to provide an atmospheric entry vehicle having a rotor which can be deployed in flight so as to decelerate the vehicle and which rotor can also be operated as a conventional powered helicopter rotor for limited periods.

Another object of the present invention is to provide a lifting body capable of high speed gliding flight of the type encountered during an atmospheric reentry, said body having a stowed rotor therein which can be deployed at the termination of such high speed glding flight for use in supplementing the lift forces generated by the basic body itself at the relatively low speeds encountered during the approach and landing phase of such a flight.

Accordingly, some more specific objects of the present invention are to provide a novel stowed rotor installation for a lifting body to give the pilot of such a body greater flexibility in planning his approach as a result of a lower rate of descent during approach and landing and better low speed control of his vehicle than would be the case with the lifting body by itself.

Of the drawings:

FIG. 2 is an enlarged fragmentary side view of the lifting body of FIG. 1, this view being partly broken away to reveal the stowed rotor in broken lines, the rotor being shown in solid lines in its trailing position.

FIG. 3 is an enlarged detailed view of the rotor of FIG. 1 showing in broken lines the positions of the blades during their initial unfolding movement and showing in solid lines the position of the blades at a slightly later stage in their unfolding movement.

FIG. 4 is an enlarged side view of the FIG. 1 vehicle with the deployed rotor shown in an overhead position wherein it is capable of generating lift to complement the lift of the basic body.

FIG. 5 is a schematic view of a portion of the control means associated with the rotor of the FIG. 1 vehicle.

Figure 1:
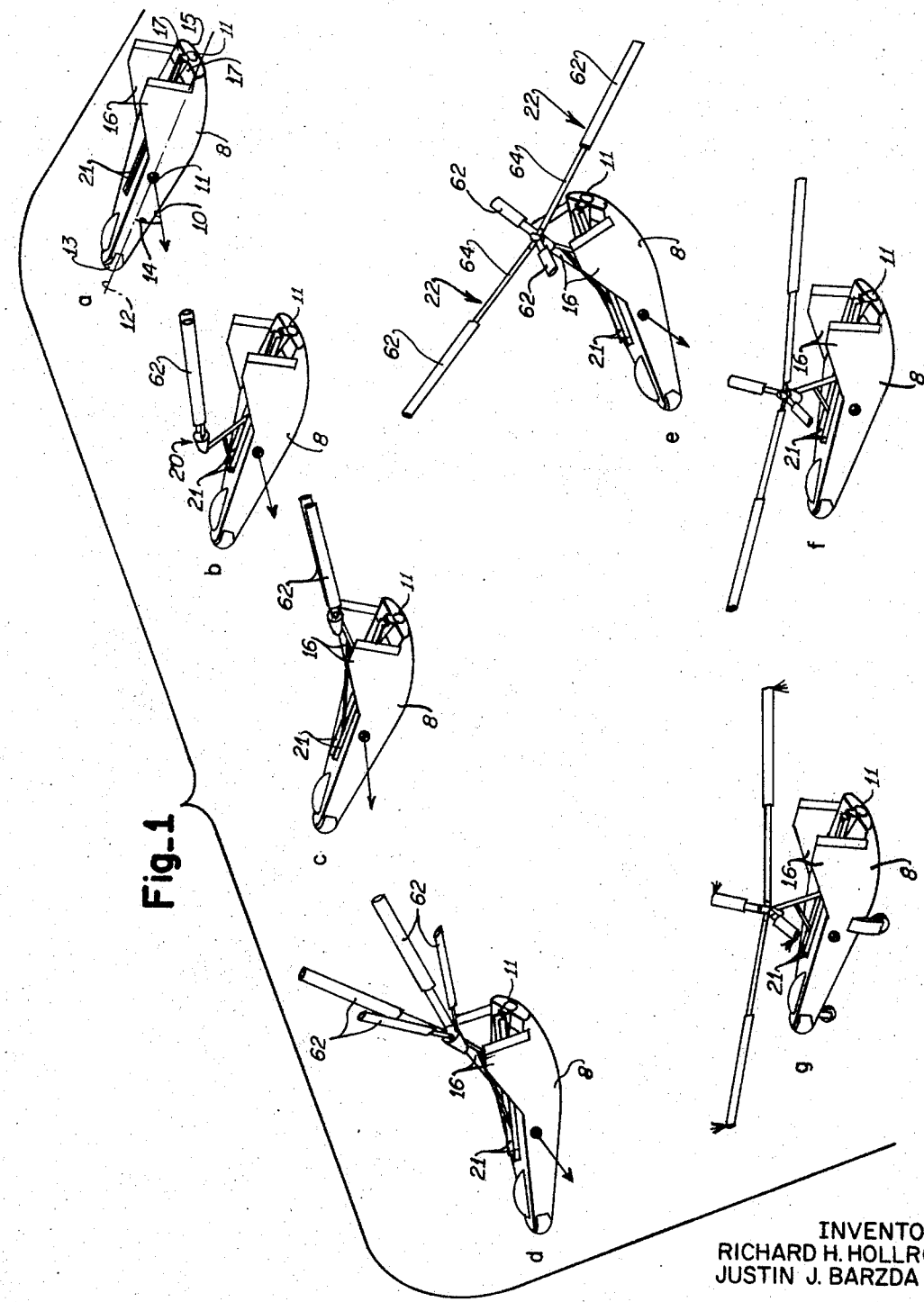
FIG. 1 shows a lifting body equipped with a rotor according to the present invention and illustrates, in the views identified by reference letters a–g inclusively, the lifting body during different stages of its flight path.

Turning now to the drawings in greater detail, and first considering more particularly view a of FIG. 1, a lifting body 8 of conventional external design is there shown and is capable of power-off gliding flight, in the direction of the arrow 10, at a particular angle of attack indicated by the reference numeral 14. The body 8 has a longitudinal axis 12 extending lengthwise through its center of gravity from its nose portion 13 to its aft portion 15. The lifting body 8 may be provided with a suitable power plant 11 capable of generating thrust generally parallel to the axis 12, and it may also include suitable reaction-type control means (not shown) for operation outside of the earth's atmosphere. During flight through the atmosphere, the power plant 11 may be used to provide propulsive thrust for autogyro mode cruise flight. For purposes of the present invention, however, it is sufficient to note that the lifting body does have a longitudinal axis 12 and is capable of generating a lift force when said axis 12 is oriented at a particular design angle of attack, such as that indicated at 14 in the drawings. During such gliding flight directional control may be achieved by use of movable portions of the vertical tail surfaces indicated generally at 16, 16 while pitch and roll control may be achieved by the use of elevons indicated generally at 17, 17.

In accordance with the present invention, the upper surface of the lifting body 8 includes a longitudinally extending receptacle or recess, indicated generally at 18, in which a rotor is movably stowed in an inactive position. The rotor is so connected with the body 8 that from its inactive position it can be deployed during flight to a trail position, shown at view c, and to a lift complementing glide or overhead position, shown at view f. View b, of FIG. 1 shows the rotor in a position intermediate its stowed or inactive position and its trailing position. View d shows the rotor still in the trail position, but with its blades unfolding and beginning to rotate. View e shows the rotor in an autorotating position wherein the body 8 is decelerated in a manner similar to the deceleration of a conventional aircraft with a drogue type parachute. View f shows the lifting body with its rotor moved forwardly out of its trail position to a position generally above the center of gravity of the body so as to generate lift in a direction complementary to the lift generated by the gliding body itself. View g shows the lifting body with its landing gear extended and with rotor tip rockets actuated to further increase the lift generated by the rotor. It should be noted, however, that the rotor tip rockets or similiar drive means for the rotor are not essential to the broader aspects of the present invention, an autorotating rotor without additional drive means being sufficient in many cases.

However, with further reference to the lifting body as shown at views f and g of FIG. 1, it should be understood that suitable means are provided for collectively and cyclically controlling the pitches of the rotor blades to permit the lifting body to be flown in the same manner as a conventional helicopter or autogyro. For example, the vehicle may either be flown along a generally vertical flight path, or may be maneuvered by control of the cyclic pitch into various forward, rearward or lateral glide paths. Also, as mentioned previously, the power plant 11 may be utilized when the rotor is in its overhead position to provide forward propulsive thrust to operate the vehicle in an autogyro cruise mode.

FIG. 2 shows the aft portion of the lifting body 8 with a part thereof broken away to reveal the elongated receptacle 18 for the folded and stowed rotor. Suitable means such as hinged doors are provided for normally closing the receptacle and are movable from their closed positions to open positions relative to the receptacle. In FIG. 2 one such door is shown at 21 in its open position.

The rotor comprises a hub assembly, indicated generally at 20, and a plurality of rotor blades 22, 22 each of which is pivotally connected at its inboard end to the hub assembly 20 as best shown in FIG. 4. The hub assembly 20 is or may be of generally conventional construction having a central axis 23 about which a hub member 31 and the outer part of an associated swash plate 30 are adapted to rotate, and it is to the rotatable hub member 31 that the rotor blades 22, 22 are connected. Each of the rotor blades 22, 22 is connected to the hub member 31 by a universal joint which permits both flapping motion about an associated flapping axis 26 and pitch changing movement about a spanwise pitch changing axis 24. The flapping axes are arranged substantially normal to the corresponding spanwise pitch changing axes and are located in a plane normal to the central hub axis. The blades are free to flap about their respective flapping axes 26, 26, but are controllably restrained in their movement about their pitch changing axes 24, 24 as discussed in greater detail hereinafter. The blades in FIG. 2 are shown folded about their respective flapping axes 26, 26 to positions wherein each blade is arranged parallel to the central hub axis 23 with their chord lines substantially tangent to a circle concentric with the central shaft axis. When the blades are in this position their pitch changing axes 24, 24 are circumaxially spaced in parallel relation about the central hub axis 23.

A nonrotating inner portion of the hub assembly 20 includes a spindle 28 on which a nonrotating inner part of the swash plate 30 is slidably received for movement between the solid and broken line positions shown in FIG. 3. The outer or rotating part of the swash plate 30 travels axially with the inner nonrotating part and carries four short links 32, 32 each of which is connected at its upper end to a pitch arm 34 rigidly connected to the inboard end of an associated rotor blade 22. The nonrotating inner part of the swash plate is connected to the spindle 28 by a ball joint so as to be tiltable with respect to the central hub axis 23. Three remotely controllable actuators 35, 35 are circumaxially spaced about the central axis 23 and are connected between the spindle and the inner part of the swash plate. These actuators are operable to tilt the swash plate and to move it axially of the spindle in response to movement of a cyclic pitch control lever 36 and a collective pitch control lever 38 in the cockpit of the vehicle as best shown in FIG. 4. In the illustrated case the swash plate actuators 35, 35 are controlled by signals fed thereto from a control mechanism, indicated generally at 40 in FIG. 4, and suitable input signals are fed to the control mechanism 40 by motion transducers or pick-offs 33, 33 located adjacent and operated by the control levers 36 and 38.

The base 37 of the rotor spindle 28 is pivotally connected to the free end of a mast, or rotor support structure, indicated at 44 in FIG. 2. The mast 44 is in turn pivotally connected at its opposite end to the lifting body 8 for movement about a transverse pivot axis 45 spaced rearwardly of the body's center of gravity 11. Suitable actuating means are provided for moving the mast 44 about the axis 45. As shown, this actuating means comprises a pair of actuators arranged in series. The first of these is a jack screw mechanism and the second is a linear hydraulic actuator. The jack screw mechanism includes a rotary hydraulic motor or the like (not shown) which drives a screw 48. The screw 48 is in turn rotatably supported relative to the lifting body itself and threadably receives a nut 50 which is slidably supported in a track 49 extending along the length of the screw and fixed relative to the lifting body. Rotation of the screw 48 therefore drives the nut 50 along the track 49 in one direction or the other depending on the direction of rotation of the screw. The linear hydraulic actuator comprises a cylinder 52 having one end pivotally connected to the nut 50, as shown at 53, and having an actuating rod 46 projecting from its other end and pivotally connected to the mast 44 at a point 55 intermediate the ends of the mast. From FIG. 2 it will therefore be understood that by proper operation of the jack screw and cylinder the mast 44 can be moved between its retracted position inside the receptacle 18, as shown by the broken lines of FIG. 2, to its fully extended position, as shown by the solid lines of FIG. 2.

The rotor hub assembly when in its trailing position, as shown by the solid lines of FIG. 2, has its central axis 23 generally aligned with the relative wind direction during gliding flight of the lifting body. That is, the central axis of the hub assembly in its trailing position is inclined with respect to the longitudinal axis 12 of the body at an angle substantially equal to the body design angle of attack during gliding flight. In this position the central axis is inclined at a small angle to the mast 44. In the stowed position of the rotor hub assembly, however, the central axis 23 and the mast 44 are both generally aligned with the longitudinal axis 12 of the body so that the central axis 23 must be rotated approximately 180° relative to the mast while the hub assembly is moved between its stowed and trailing positions. Means for so rotating the hub assembly relative to the mast 44 are provided and comprise a sector gear 54 fixed to the base 37 of the hub assembly, and a gear 56 driven by an associated motor M supported on the free end portion of the mast 44. A controller, shown at 58 in FIG. 5, is provided for the motor M and controls the operation of the motor in such a manner as to maintain the central axis 23 in general alignment with the relative wind during movement of the mast 44 about its pivot 45. More particularly, the controller 58 operates the motor M to position the hub assembly relative to the mast in accordance with the position of the mast relative to the body 8. An input signal to the controller is provided by an angular position sensor, or potentiometer 57 mounted adjacent the pivotal connection between the mast and the body, and a feedback signal is provided by an angular position sensor, or potentiometer 59 mounted adjacent the pivotal connection between the mast and rotor hub assembly.

From FIGS. 2 and 5, it will be seen that in the trail position of the hub assembly the hub axis 23 is inclined to the body axis 12 at an angle substantially equal to the body design angle of attack, as indicated at 14 in FIG. 1a, and further that said hub axis 23 if projected downwardly passes through or very close to the body center of gravity 11. The mast and hub assembly are therefore so arranged that when said hub assembly is in its trailing position little or no adverse pitching moments are created on the vehicle. The blades 22, 22, being parallel to the hub axis 23, are also generally aligned with the relative wind during extension of the mast, as shown in FIG. 1c. Therefore, some force must be exerted on these blades in order to cause them to autorotate after the hub assembly reaches its trailing position, and in the illustrated case such a force is exerted on the blades by operation of the collective pitch control lever 38. With the blades 22, 22 in their folded positions, sliding movement of the swash plate 30, caused by movement of the collective pitch lever 38 and accompanying simultaneous operation of the three actuators 35, 35, will cause the pitch links 32, 32 to move the pitch arms 34, 34 to move the blades in a skewing fashion from the full line to the broken line position of FIG. 3. Opposite blades of the four-bladed rotor are skewed in opposite directions so that the aerodynamic forces on the blades create a moment about the central hub axis which starts the rotor rotating. Once the rotor has begun to rotate centrifugal forces on the blades rotate the blades about their respective flapping axes 26, 26 so that the blades move from the positions indicated by view d of FIG. 1 to the positions indicated by view e of FIG. 1. In the latter positions the rotor blades are controllable, by the collective control lever 38 to vary their pitches and to thereby vary the retarding force exerted on the body 8. As shown in FIG. 1, the rotor blades 22, 22 are preferably, but not necessarily, of a telescoping construction and include outboard portions 62, 62 which are moved radially outwardly to increase the lengths of the blades as the speed of the rotor increases. This extending movement of the outboard blade portions may be effected by a means utilizing the centrifugal force exerted on the outboard blade portions after the rotor starts to rotate. As an alternative to this, actuators operating between the inboard and outboard blade portions may be used to extend the blades prior to or after the start of rotor rotation. By the use of telescoping blades a relatively large rotor may be stowed in a relatively small receptacle on the upper surface of the lifting body.

The means for moving the mast 44 and rotor hub assembly 20 is also operable to move the mast forwardly out of the trailing position described above to a position which will be referred to herein as an overhead position wherein the hub assembly is located generally above the center of gravity of the body and the hub axis is positioned so as to pass through or close to the center of gravity. Preferably and as shown, the jack screw mechanism and linear hydraulic actuator for moving the mast 44 are so constructed and arranged that the FIG. 4 position of the mast 44 is obtained when the rod 46 is fully retracted in the cylinder 52 and the nut 50 of the jack screw mechanism is in its rearwardmost position. The motor M, through the gears 54 and 56, moves the hub assembly relative to the mast 44 during the forward motion of the mast. The operation of the motor M is further controlled by the controller 58 to maintain the hub axis 23 generally aligned with the body center of gravity as the mast is so moved. Since the controller 58 is also active to maintain the hub axis 23 at a different angle to the body during rearward movement of the mast 44 from its stowed position, it follows that an alternate control program must be provided for the orientation of the hub axis 23 with respect to the mast 44 during forward movement thereof. As shown in FIG. 5, a switch 60 is provided for this purpose to divert the input signal from the position sensor 57 to one or the other of two input terminals of the controller 58. That is, during rearward movement of the mast, the switch is conditioned to divert the signal from the sensor 57 to one input terminal of the controller 58, and during forward movement of the mast the switch is conditioned to divert the input from the sensor 57 to the other input terminal of the controller. Each input terminal of the controller has in turn a different program associated therewith with one being a program to control the hub assembly position during rearward movement of the mast and the other being a program to control the hub assembly position during forward movement of the mast. The switch 60 may be operated manually or automatically as by the movement of the mast to the rearwardmost position. It will of course be understood that the illustrated switch 60 is exemplary only and that various other means may be used for causing the controller to adjust the hub assembly differently relative to the mast during forward mast movement as compared to the adjustment effected during rearward mast moment.

As mentioned hereinabove, with the rotor arranged in its overhead position above the center of gravity of the lifting body, the lift of the rotor complements the lift of the lifting body, and permits gliding flight at relatively shallow glide angles. This configuration also permits flight at relatively slow forward speeds so that the pilot can either maneuver at a relatively shallow glide angle or accomplish a generally vertical autorotative descent in order to gain access to unprepared landing sites of a type unavailable to a lifting body not equipped with a rotor of the present invention. In the preferred embodiment of this invention reaction or rocket engines are also provided at the rotor blade tips. These engines may be of fairly small size and of short operating time and may be operated just prior to landing to permit limited horizontal or powered helicopter or hovering flight and to aid the pilot in accomplishing a helicopter type landing with little or no forward movement. Without the blade tip engines the autorotating rotor may nevertheless be utilized to accomplish a substantially vertical soft landing by utilizing the rotary inertia of the rotor and collectively positively flaring the rotor blades immediately prior to landing, in accordance with conventional landing procedure for autogyros.

The invention claimed is:

1. In combination with a body capable of power off gliding flight through the atmosphere with its longitudinal axis arranged at a predetermined design angle of attack, a rotor including a hub assembly having a central axis of rotation and a plurality of rotor blades connected with said hub assembly, an elongated mast having one end connected with said rotor hub assembly for movement about a first axis extending generally transversely of said body and having its other end connected with said body for movement about a second axis extending generally transversely of said body, said second transverse axis being spaced rearwardly from the center of gravity of said body, first actuating means for moving said rotor hub assembly about said first axis relative to said mast, second actuating means for moving said mast about said second axis relative to said body between a stowed position in which said mast is located parallel to the longitudinal axis of said body and in which said one end of said mast is located forwardly of said body connected end and a rearward position wherein said mast extends generally upwardly and rearwardly from said second axis so as to position said rotor hub assembly above and rearwardly of said body center of gravity, said second actuating means also serving to move said mast from said rearward position to an overhead position intermediate said stowed and rearward positions, said rotor blades being connected to said rotor hub assembly for movement about flapping axis between folded positions wherein the spanwise axes of said blades are circumaxially spaced in parallel relation about said hub central axis and extended positions wherein said blades extend generally radially outwardly from said central axis, said central axis being arranged in substantially parallel relationship with said mast when the latter is in its stowed position, and control means associated with said first actuating means for maintaining said hub central axis inclined relative to the longitudinal axis of the vehicle at an angle substantially equal to said design angle of attack during movement of said mast from its stowed to its rearward position.

2. The combination defined in claim 1 wherein said control means also serves to maintain said central axis of said hub assembly substantially coincident with said body center of gravity during movement of said mast from its rearward position to its overhead position.

3. In combination with a body capable of power off gliding flight through the atmosphere with its longitudinal axis arranged at a predetermined design angle of attack, a rotor including a hub assembly having a central axis of rotation and a plurality of rotor blades connected with said hub assembly, a rotor support structure, means connecting said hub assembly to said support structure for movement relative to said support structure about a first axis extending generally transversely of said body, means connecting said support structure with said body for movement between a rearward position whereat said hub assembly is located near the rear of said body and an overhead position wherein said hub assembly is located forwardly of the position occupied when said support structure is in said rearward position, an actuating means for moving said rotor hub assembly about said first axis relative to said mast, and a control means associated with said actuating means for maintaining said central axis of said hub assembly substantially coincident with the center of gravity of said body during movement of said mast from its rearward to its overhead position.

4. In combination with a body capable of power off gliding flight through the atmosphere with its longitudinal axis arranged at a predetermined design angle of attack, a rotor including a hub assembly having a central axis of rotation and a plurality of rotor blades connected with said hub assembly, a rotor support structure, means connecting said hub assembly to said support structure for movement relative to said support structure about a first axis extending generally transversely of said body, means connecting said support structure with said body for movement between a rearward position whereat said hub assembly is located near the rear of said body and an overhead position wherein said hub assembly is located forwardly of the position occupied when said support structure is in said rearward position, controllable means for collectively and cyclically varying the pitches of said rotor blades.

5. The combination defined in claim 4 further characterized by at least some of said rotor blades having engines located at the outboard ends thereof which engines are operable to impose additional torque on said rotor.

6. The combination defined in claim 4 wherein said controllable means is further so constructed and arranged as to be effective to collectively skew said blades when in their folded positions to initiate rotor rotation when said mast is in its rearward position with said blades folded.

7. The combnation defined in claim 4 further characterized by each of said blades including an outer end which is movable radially in a telescoping fashion relative to the remainder of the blade to vary the length of the blade.

8. The combination as defined in claim 1 further characterized by said flapping axes about which said blades are foldable being substantially normal to the corresponding spanwise axes of said blades and being located in a plane normal to said central hub axis so that said blades when folded with their spanwise axes parallel to said central axis have their chord lines tangent to a circle concentric with said central axis.

9. The combination as defined in claim 4 further characterized by said body including a power plant operable to provide forward propulsive thrust to enable flight of said body in an autogyro cruise mode when said rotor is in said overhead position.

10. In combination with a body capable of power off gliding flight through the atmosphere with its longitudinal axis arranged at a predetermined design angle of attack, a rotor including a hub assembly having a central axis of rotation and a plurality of rotor blades connected with said hub assembly, a rotor support structure, means connecting said hub assembly to said support structure for movement relative to said support structure about a first axis extending generally transversely of said body, means connecting said support structure with said body for movement between a rearward position whereat said hub assembly is located near the rear of said body and an overhead position wherein said hub assembly is located forwardly of the position occupied when said support structure is in said rearward position, said body including a power plant operable to provide forward propulsive thrust to enable flight of said body in an autogyro cruise mode when said rotor is in said overhead position, controllable means for collectively and cyclically varying the pitches of said rotor blades.

References Cited

UNITED STATES PATENTS

| | | | |
|---|---|---|---|
| 2,334,028 | 11/1943 | Raio | 244—139 |
| 2,497,590 | 2/1950 | Drill | 244—139 |
| 2,776,017 | 1/1957 | Alexander | 244—138.1 X |

MILTON BUCHLER, *Primary Examiner.*

RICHARD A. DORNON, *Assistant Examiner.*

U.S. Cl. X.R.

244—17.25, 17.27, 36, 73, 139; 170—160.12